T. P. KNOWLAND.
TROLLEY AND SWITCH.
APPLICATION FILED DEC. 31, 1910.
1,048,176.
Patented Dec. 24, 1912.
2 SHEETS—SHEET 1.
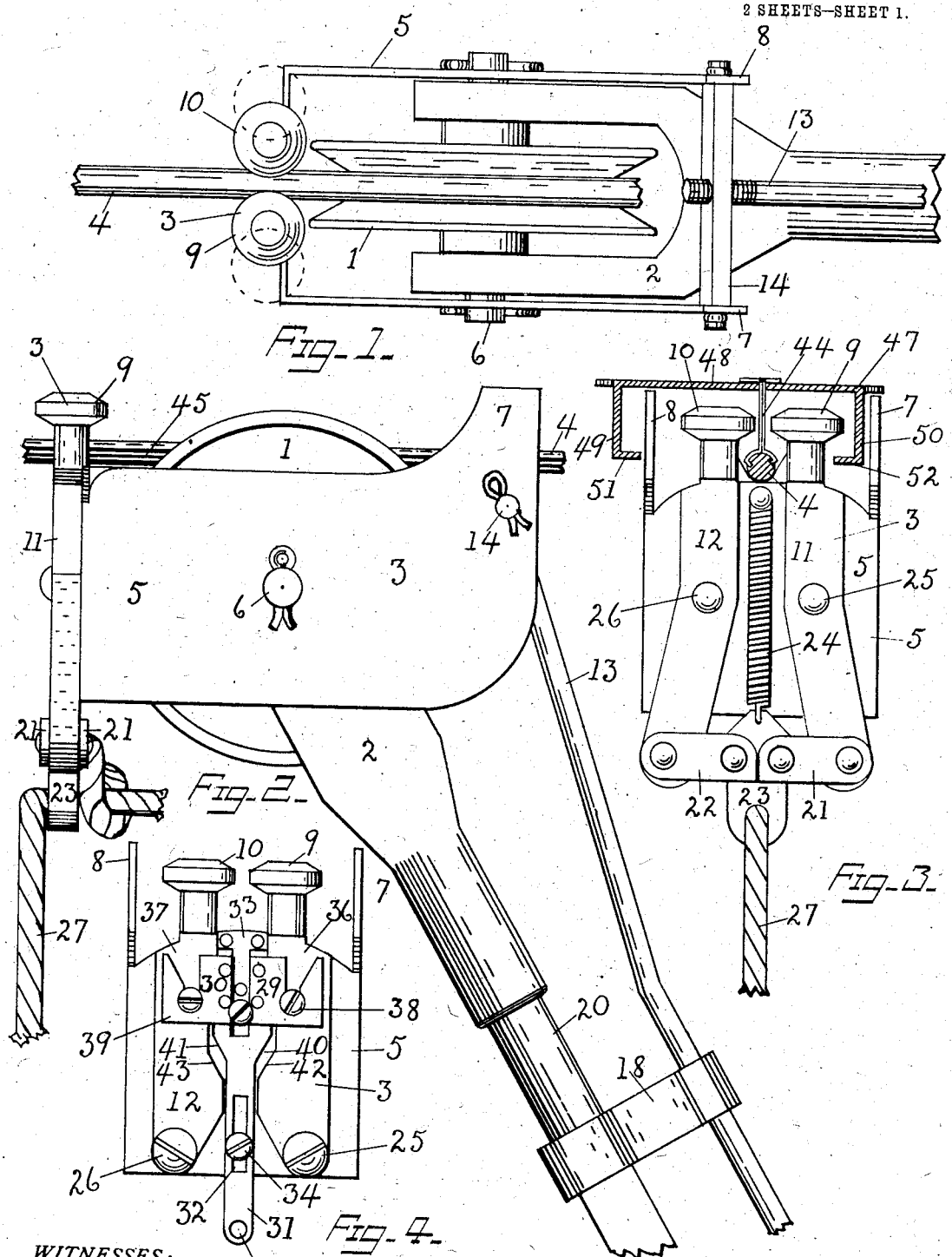
WITNESSES:
Maria K. Beynroth
Annie B. Knobel
INVENTOR.
Thomas P. Knowland.
BY Abraham Knobel,
ATTORNEY.

T. P. KNOWLAND.
TROLLEY AND SWITCH.
APPLICATION FILED DEC. 31, 1910.
1,048,176.
Patented Dec. 24, 1912.
2 SHEETS—SHEET 2.
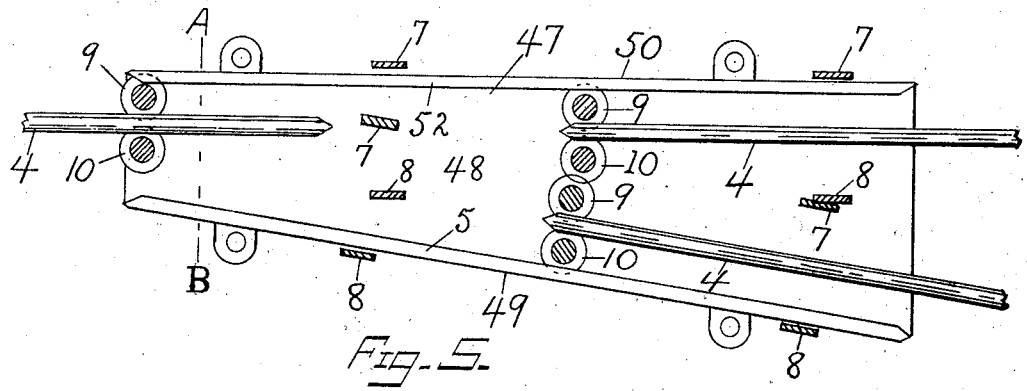
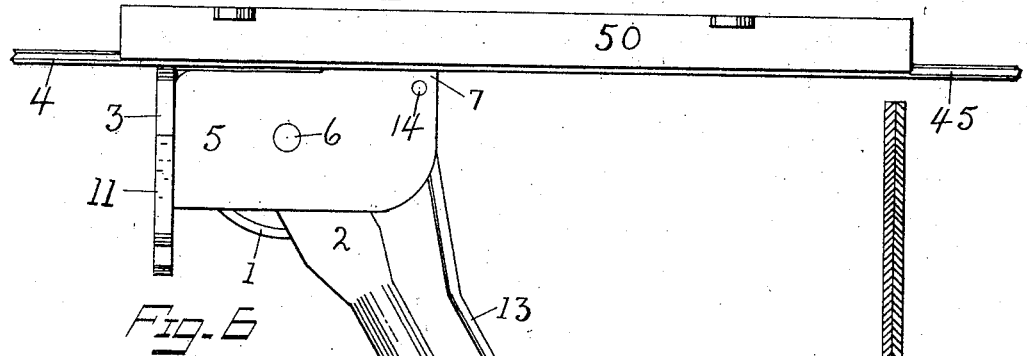
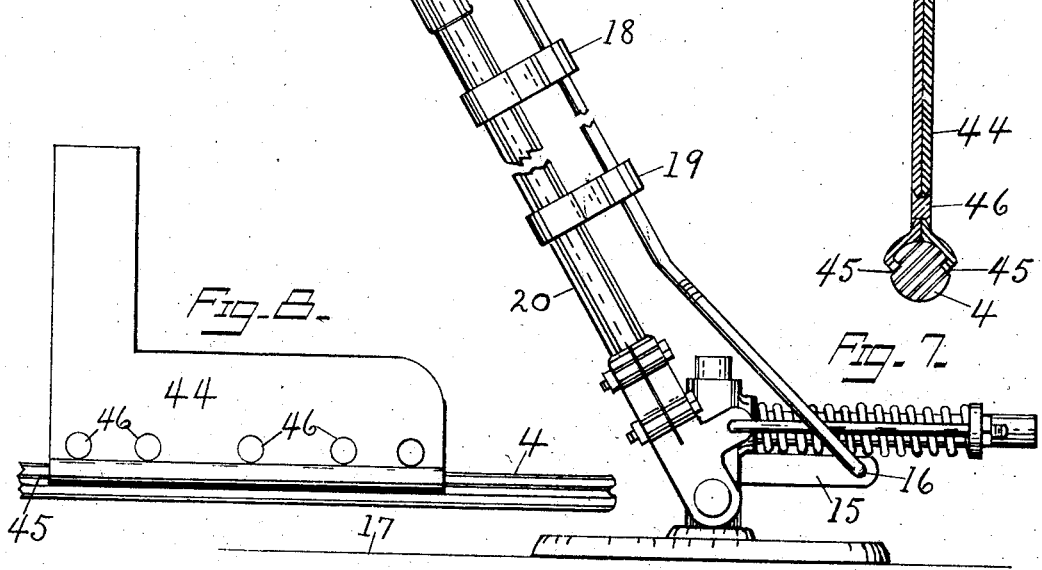
WITNESSES:
Maria K Beynroth
Annie B. Knobel
INVENTOR.
Thomas P Knowland
BY Abraham Knobel,
ATTORNEY.

UNITED STATES PATENT OFFICE.

THOMAS P. KNOWLAND, OF JEFFERSONVILLE, INDIANA, ASSIGNOR OF TWO-THIRDS TO LAURENT A. DOUGLASS, OF JEFFERSONVILLE, INDIANA.

TROLLEY AND SWITCH.

1,048,176.  Specification of Letters Patent.  Patented Dec. 24, 1912.

Continuation of application Serial No. 469,641, filed December 28, 1908. This application filed December 31, 1910. Serial No. 600,311.

*To all whom it may concern:*

Be it known that I, THOMAS P. KNOWLAND, a citizen of the United States, residing at Jeffersonville, in the county of Clark and State of Indiana, have invented a new and useful Trolley and Switch, of which the following is a specification.

This invention relates to trolleys and trolley switches for electric railways, and some of the objects of my improvement are, to prevent the trolley accidentally leaving the trolley wire, to provide simple means for removing the trolley from the trolley wire, to prevent the trolley leaving the wire at switches and turnouts, to insure the automatic switching of the trolley, simplicity of construction and operation, and durability. These and other objects I attain by means of the mechanism and structure illustrated in the accompanying drawings.

This application is a continuation of my former application, Serial No. 469,641, for safety guard device for electric railway trolleys and automatic electric railway frogs for trolleys, filed December 28, 1908.

In the drawings—Figure 1 is a top plan view of the trolley; Fig. 2, a side elevation of the trolley; Fig. 3, a rear end view of the trolley and a sectional view of the switch, the section being made approximately on the line A—B of Fig. 5; Fig. 4, a rear end view of the trolley, showing a modification of the safety mechanism; Fig. 5, an underneath plan view of the switch, showing the hubs of the safety wheels and the guide fingers of the trolley in section; Fig. 6, a side elevation of the switch, the trolley, and trolley pole base in operative relation; Fig. 7, a cross sectional view of the trolley wire and my improved hanger therefor; and, Fig. 8 is a side elevation of the trolley wire and the hanger.

Similar reference numbers refer to similar parts throughout the several views of the drawings.

The trolley wheel 1, and the harp, 2, are of the conventional construction. Safety mechanism, 3, is provided and pivotally mounted on the shaft of the trolley wheel, for the purpose of locking the trolley to the trolley wire, 4, against accidental leaving. The safety mechanism comprises a frame, 5, which surrounds the trolley wheel and harp and is pivotally mounted on the shaft, 6, of the trolley wheel and other coöperating parts. The frame 5 is formed in front with a pair of upward extending guide fingers, 7 and 8, the purpose of which will be hereinafter described, and a pair of locking wheels, 9 and 10, are provided, vertically journaled on levers, 11 and 12, respectively, and adapted to straddle and engage the upper surface of the trolley wire 4, whenever the trolley moves downward away from the trolley wire.

The frame 5 is held in parallel relation to the trolley wire 4, and, consequently, the axes of wheels 9 and 10 in transverse relation to the wire, by means of a rod, pivoted at one end in frame 5 through the instrumentality of a cross bar, 14, and at its opposite end in the trolley pole base, 15, at 16. In this way the frame 5 is flexibly mounted in parallelogrammatic relation with the top of the car represented by line 17.

Suitable guide clips, 18 and 19, for rod 13, are secured on trolley pole 20.

Locking mechanism, for locking wheels 9 and 10 in closed relation, is provided, which comprises toggles, (Fig. 3) 21 and 22, pivotally connecting levers 11 and 12 with a block, 23, which, in turn is normally drawn upward by a tension spring, 24. The levers 11 and 12 are pivotally mounted on frame 5 at 25 and 26 respectively.

The rope, 27, for removing the trolley from the wire and replacing it, is attached to block 23. Spring 24 is made of such strength that it yields somewhat in advance of the trolley pole base spring, so that when the rope 27 is pulled to remove the trolley from the wire the spring 24 yields first, permitting toggles 21 and 22 to flex, causing the lower ends of levers 11 and 12 to approach each other and the upper ends bearing the rollers 10 and 11 to separate and open to allow wire 4 to pass out. When the trolley is being replaced, the rollers 9 and 10 remain open till the trolley wheel 1 receives the upward pressure and rope 27 is relieved of the strain due to the action of the base spring, when the toggles 21 and 22 straighten and lock the wheels 9 and 10 in closed relation.

In the modification shown in Fig. 4, the levers 11 and 12 are pivotally mounted on frame 5 at their lower ends, so that the wheels 9 and 10 are adapted to swing apart as in Fig. 3. The locking here is accomplished through the instrumentality of plates, 29 and 30, which are mounted on a vertically slidable stem, 31. Stem 31 is bifurcated at its upper end, and provided in its shank below with a slot, 32. A slide block, 33, is secured on frame 5, extends into the bifurcation of stem 31, and serves to guide the upper end of the stem, while a screw, 34, passing through slot 32 and mounted in frame 5 guides the lower end. The lower end of stem 31 is provided with an eye, 35, for receiving rope 27. Plates 29 and 30 are formed with tapering slots, 36 and 37, in which stud screws, 38 and 39, mounted in levers 11 and 12, are guided. Stem 31 and attached plates 29 and 30 are retained normally in elevated position by a tension spring, which is not shown, mounted behind and on the rear wall of frame 5 and attached to a stud in stem 31. This spring, similarly to spring 24, yields to stress in advance of the trolley pole base spring, so that when stem 31 is pulled, the stem slides downward, studs 38 and 39 are released in the upper and wider portion of slots 36 and 37, the inclined planes, 40 and 41, of the stem engage inclined planes, 42 and 43, of levers 11 and 12 and swing the levers apart. It will be understood that levers 11 and 12 are locked in closed relation by studs 38 and 39 being engaged by the lower, vertical walls of slots 36 and 37, and they are closed by the ascending inclined walls of these slots.

It is obvious that, in order that wheels 9 and 10 may pass the trolley wire hangers freely, the shanks of the hangers must be sufficiently thin. The hanger, 44 (Figs. 3, 7 and 8) is formed of two plates of sheet steel, preferably, adapted to embrace and enter the grooves, 45, in trolley wire 4 and secured together by means of flush head rivets, 46. In Fig. 3 the trolley wire 4 is shown suspended in a switch, 47, the stem of the hanger 44 being passed through a slot in the horizontal plate of the switch and clenched on top of the plate.

For the purpose of switching and effecting turnouts, the switch 47 is provided, which is formed to coöperate with fingers 7 and 8 and locking wheels 9 and 10. To this end (Figs. 3, 5, and 6) the switch comprises a horizontal plate, 48, provided at its long edges with downward extending flanges, 49 and 50, which in turn, are formed with mutually approaching horizontal flanges, 51 and 52, respectively.

Referring now to Fig. 5, it will be observed that if the car is traveling on the straightaway track, the finger 7 passes to the outside of flange 50 while flange 8 passes under plate 48 and between the flanges 49 and 50, and wheel 9 passes between plate 48 and flange 52, in position to engage said flange if the trolley should be depressed. It will be seen that under these conditions the trolley wheel and wheels 9 and 10 must strike the straightaway trolley wire fair. On the other hand, if the car takes a switch, the trolley wheel and harp with its frame 5 approaches the trolley switch obliqued, so that finger 8 passes without flange 51 while finger 7 passes within flange 50. It will be seen that under these conditions the trolley wheel and wheels 9 and 10 must strike the turnout trolley wire fair and wheel 10 will engage flange 51 if the trolley is sufficiently depressed.

With the improvement just described, the trolley is at all times securely locked to the trolley wire, and therefore much greater speed may be attained with safety than with the apparatus now in general use.

Having thus described my invention, so that any one skilled in the art pertaining thereto may understand its construction and use, I claim—

In a trolley for electric cars, a harp, a trolley wheel, a frame pivotally mounted about said trolley wheel on the trolley wheel pin, guide fingers on the front of said frame, vertically disposed levers mounted on the rear wall of said frame, safety guide rollers mounted on the upper ends of said levers, an opening, closing, and locking element in operative relation with said levers and connected with the trolley rope, and a rod connecting said frame with the trolley base on the car whereby said frame is held parallel with said base.

THOMAS P. KNOWLAND.

Witnesses:
MARIA K. BEYNROTH,
ABRAHAM KNOBEL.

Copies of this patent may be obtained for five cents each, by addressing the "Commissioner of Patents, Washington, D. C."